United States Patent
Bolgár et al.

(10) Patent No.: US 7,040,348 B2
(45) Date of Patent: May 9, 2006

(54) ARRANGEMENT FOR A SINGLE-GRIP MIXING FAUCET BEING OPERATED BY TURNING ONLY

(75) Inventors: György Bolgár, Budapest (HU); Attila Kovács, Budapest (HU)

(73) Assignee: KEROX Mulipolár II. Ipari és Kereskedelmi Kft., Diosd (HU)

( * ) Notice: Subject to any disclaimer, the term of this patent is extended or adjusted under 35 U.S.C. 154(b) by 175 days.

(21) Appl. No.: 10/825,222

(22) Filed: Apr. 16, 2004

(65) Prior Publication Data

US 2005/0005977 A1 Jan. 13, 2005

(30) Foreign Application Priority Data

Apr. 16, 2003 (HU) .................................... 0301021

(51) Int. Cl.
*F16K 11/074* (2006.01)
(52) U.S. Cl. .................................. 137/625.41; 251/340
(58) Field of Classification Search ........... 137/625.41, 137/801; 251/340
See application file for complete search history.

(56) References Cited

U.S. PATENT DOCUMENTS

| 1,564,856 | A | | 12/1925 | Karlsen | |
|---|---|---|---|---|---|
| 1,894,903 | A | * | 1/1933 | Dawson | 137/625.41 |
| 3,156,260 | A | * | 11/1964 | Harvey et al. | 137/625.41 |
| 4,453,567 | A | * | 6/1984 | MacDonald | 137/614.11 |
| 5,185,893 | A | * | 2/1993 | Lin | 4/677 |
| 6,131,611 | A | * | 10/2000 | Knapp | 137/614.17 |
| 6,394,133 | B1 | * | 5/2002 | Knapp | 137/615 |
| 6,893,003 | B1 | * | 5/2005 | Gilbert | 251/368 |

FOREIGN PATENT DOCUMENTS

| EP | 0 616 156 A | 9/1994 |
|---|---|---|
| GB | 2 112 113 A | 7/1983 |
| GB | 2 297 604 A | 8/1996 |
| WO | WO 02/14722 A1 | 2/2002 |

\* cited by examiner

*Primary Examiner*—John Fox
(74) *Attorney, Agent, or Firm*—Venable LLP; Robert Kinberg

(57) ABSTRACT

The invention relates to a arrangement for single-grip mixing faucets operated by turning only, comprising a fixed inlet disc (11) and a rotating regulation disc (16) arranged above each other forming thereby a plane seal, for regulating the amount and ratio of the cold and hot water flowing through the system. The cold water inlet channel (12) connected to the cold water network and the hot water inlet channel (13) are developed in the fixed inlet disc (11) whereas the cold water flow-through channels (17) and the hot water flow-through channels (18) are developed in the rotating regulation disc (16). The cold water flow-through channel (17) and the hot water flow-through channel (18) are connected to the mixing space (19), which is developed either in the regulation disc (16), or in a turning element (20) being in an operation connection with the regulation disc (16), at the side of the regulation disc (16) opposite to the inlet disc (11). The operating arm (28) is fixed to the turning element (20) at its end opposite to the regulation disc (16).

The essence of the arrangement lies in that in the turning element (20) an axial duct (27) is situated leading also through the operating arm (28), one end of which is connected to the mixing space (19), whereas its other end is connected to the duct (30) developed in the armature discharge (29) joined to the turning element (30) above the operating arm (28), which duct (30) is in connection with the discharge outlet (31).

1 Claim, 4 Drawing Sheets

ARRANGEMENT FOR A SINGLE-GRIP MIXING FAUCET BEING OPERATED BY TURNING ONLY

CROSS-REFERENCE TO RELATED APPLICATIONS

Priority is claimed with respect to Hungarian Patent Application No. P 0301021 filed Apr. 16, 2003, the disclosure of which, together with each U.S. foreign patent and patent application mentioned below, is incorporated herein by reference.

FIELD OF THE INVENTION

The invention relates to a arrangement applicable for single-grip mixing faucets being operated by turning, and comprising a fixed inlet and a rotating regulation disc arranged on each other. The arrangement can be used for regulation of the amount and the ratio of the cold and warm water flowing through the system, and forming a plane seal. The inlet channel for the cold water is connected to the water network and the inlet channel for the warm water are developed in the fixed inlet disc, whereas in the rotating regulation disc the flow-through channels of the cold and warm water are to be found. The flow-through channels of the cold and warm water are connected to a mixing space situated either in the regulation disc, or in a turning element being in an operation connection with the regulation disc and fixed at the side of the regulation disc opposite to the inlet disc. To the opposite end of the turning element to the regulation disc an operation arm is fixed.

In the wide-spread single-grip valve batteries provided with plane seals made of a ceramic material it often happens that due to the two kinds of motion of the operating arm, it moves also in the other direction when moving it to one direction, thus its operation is ambiguous. In order to eliminate this instability in its adjustment, the so-called safety single-grip valve batteries, shortly faucets, appeared for specific applications. They are particularly needed in hospitals, laboratories where for the sake of sterility, the operating arm is moved often by the metacorpus or by the forearm.

BACKGROUND OF THE INVENTION

Numerous solutions were developed for providing safety faucets, such as described in the patents DE-32.18.091, EP-0.557.696, EP-0.653.581, GB-2.073.373, WO-99/31.417 or WO-99/39.119, however, in all of them, the operating arm can be turned only to the rotation direction, thus the faucets operate only in a given series so that at turning the arm, first the cold water starts to flow, and by turning it further, more and more hot water is mixed to it, until in the exterior position only hot water is flowing. The advantage of this solution is that the faucet can be opened only by opening the cold water.

As to their arrangement, these faucets are similar to the normal single-grip faucets, i.e. in the cartridge of the faucet a fixed inlet disc is situated underneath, and above it, a rotating regulation disc can be found which form together a plane seal. In the inlet disc, the inlet channel for the cold water connected to the water network and the inlet channel for the hot water are situated in an excentric position, whereas in its centre the outlet channel for the mixed water connected to the discharge outlet pipe end is to be found, whereas in the regulation disc, in the zone of the inlet channels two flow-through channels, and in an overlapping position with the outlet channel, a flow-back channel are developed. The common cross-section of the inlet channels and the flow-through channels determines any time the flow-through cross-sections, i.e. the amounts of the cold and hot water flowing through the system. The regulation disc is connected from above to an operating element. In the operating element, the mixing space is developed above the regulation disc, which is in a permanent connection with both the regulation channel and the flow-back channel. The operating arm of the valve battery is fixed to the upper part of the operating element either directly, or through a carrier element.

The difference between a normal faucet and a safe faucet consists in the form of the inlet channels and the regulation channels. As the regulation disc makes only a rotating motion, the arrangement of the inlet channels and the regulation channels should be so that their mutual turnings should regulate both the absolute and the relative amounts of the cold and hot water flowing through the system. It can be seen from the patents cited above that at choosing the forms and arrangement of the inlet and the regulation channels, different viewpoints could be considered, thus they show a very large variety.

Hospitals and laboratories generally required a much longer operating arm as usual, for the sake of easier handling. Based on this requirement, a construction trend was born, in which the outlet stump and the operating arm was unified. For this, several examples are shown in U.S. Pat. No. 4,768,557.

In one embodiment a rotating slide valve of horizontal axis is situated in the housing of the faucet, the outlet arm is fixed to its one end of this slide valve. In the rotating slide valve, in the vertical planes relative to its axis two oblong openings are situated shifted relative to each other, they turn above the inlet borings developed in the housing. The amount and the temperature of the water can be regulated by turning the slide valve, in the extreme position they are closed, thus from one closed position to the other, the whole regulation should be performed.

This version has also an embodiment having plane discs in which the slide valve of a horizontal axis is substituted by plane discs having also horizontal axes.

In an improved embodiment of the previous example, two slide valves are within each other, one is regulating the amount, the other one the temperature. The slide valve in inside is provided with a rotating knob opposite to the outflow arm.

In another version the regulating element is a slide valve can be shifted vertically and can be rotated around its axis. The outlet arm elevates and drops the slide valve by a gear-rack transmission, this provides the quantity regulation, and at the same time, it is in a carrying connection with the slide valve in the rotation direction, the rotation of the slide valve ensures the temperature regulation.

In one embodiment of the rotating and axially moving solution, the outlet arm divides the slide valve into two parts, and moves it axially by an excenter arrangement. This provides the temperature regulation. Tilting of the outlet arm rotates the slide valve, and this provides the regulation of the amounts.

In a third version, the regulating elements are traditional plane discs characteristic for single-grip faucets. The outlet arm is connected into a collar of hemisphere form sealed in the housing of the valve battery. The mixing space above the regulation disc is developed between the collar and the regulation disc, and not in the carrier element being in connection with the regulation disc.

Another basic operation principle is shown in U.S. Pat. No. 5,685,339. In this, a ball valve is situated in the housing of the faucet, with an upside-down Y-formed duct in it. The outlet arm is connected to the shaft of the Y, and opposite to the shafts, the inlet openings for the cold and hot water are developed in the housing. At turning the ball valve in the plane of the inlet openings, temperature regulation occurs, turning from this position to every direction, the inlet openings are closed.

In the above solutions, in addition to the possibility of shifting, another disadvantage is that their production is unfavourable due to their complicated structure.

SUMMARY OF THE PRESENT INVENTION

The object of the present invention is to develop a single-grip mixing faucet having the advantages of both safety and outlet arm faucets. The invention is based on the recognition that a turning element can be developed to the well-proved, easily can be produced safety faucets with ceramic discs, in which the size of the axis allows for the development of an axial duct. Through this duct, the mixing space above the regulation disc can be connected to the discharge outlet.

Hence, the invention is an arrangement for a single-grip mixing faucet being operated by turning only, comprising a fixed inlet disc and a rotating regulation disc arranged on each other forming together a plane seal, and serving the regulation of the amount and ratio of cold and hot water flowing through it. The inlet channel of cold water connected to the water network and the inlet channel for the hot water are situated in the fixed inlet disc, whereas the flow-through channels for the cold and hot water are developed in the regulation disc. The flow-through channels for cold and hot water are connected to a mixing space, which is developed either in the regulation disc, or in the turning element at the side of the regulation disc opposite to the inlet disc being in an operation connection with the regulation disc. The operating arm is situated at the part of the turning element opposite to the regulation disc.

The essence of the arrangement lies in that an axial duct leading also through the operation arm is situated in the turning element, one end of which is connected to the mixing space, the other end to the duct developed in the armature discharge connected to the turning element above the operating arm, the duct being in connection with the discharge outlet.

The invention can be best understood on the basis of an embodiment shown in the drawings.

DESCRIPTION OF THE A PREFERRED EMBODIMENT

Figure 1:
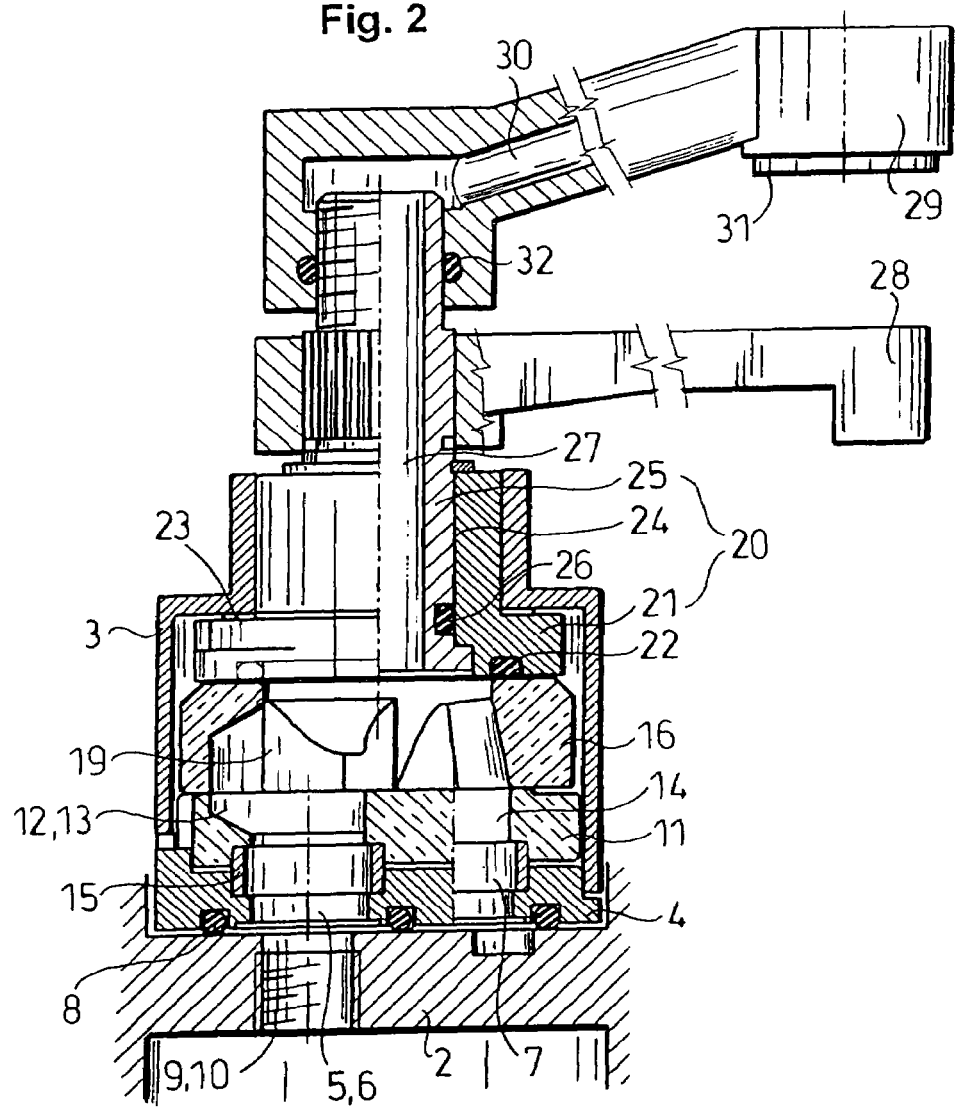
FIG. 1 shows a faucet cartridge according to the invention in an axial, step-wise section marked by I-II in FIG. 2.

As is known, the functional elements of up-to-date single-grip mixing faucets are unified in a faucet cartridge. FIG. 1 shows such a faucet cartridge 1. In order to understand the invention, the detailed description of this cartridge is satisfactory. The faucet cartridge 1 is built into a housing 2 of the mixing faucet shown only in part.

Figure 2:
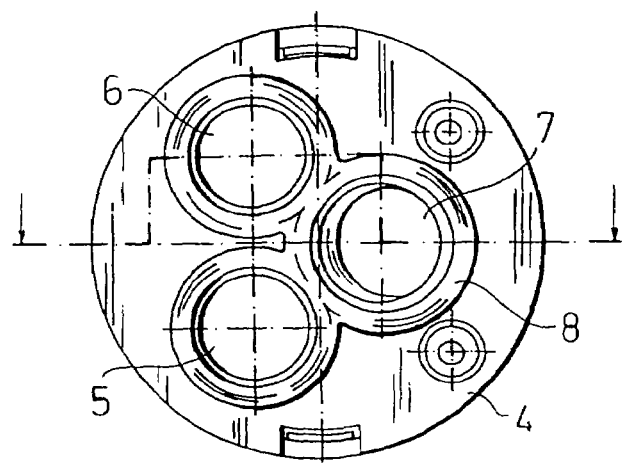
FIG. 2 is the bottom view of the faucet cartridge.

Faucet cartridge 1 comprises a cylindrical cartridge housing 3 with a footing 4 fixed into its bottom. Footing 4 has three flow-through openings 5,6 and 7 surrounded by a single piece shaped seal 8 at the bottom of footing 4 as shown in FIG. 2. Opening 5 is connected to the cold water pipe 9 of cold the water network, opening 6 to the hot water pipe 10 of the water network. Opening 7 plays no role in the present embodiment of the faucet cartridge 1 according to the invention, but footing 4 is developed so that it can be used also in mixing faucets of other constructions, where it would be connected to the discharge outlet of the mixing faucet. In the embodiment shown, the opening 7 is closed by the internal surface of the housing 2 of the mixing faucet.

Figure 3:
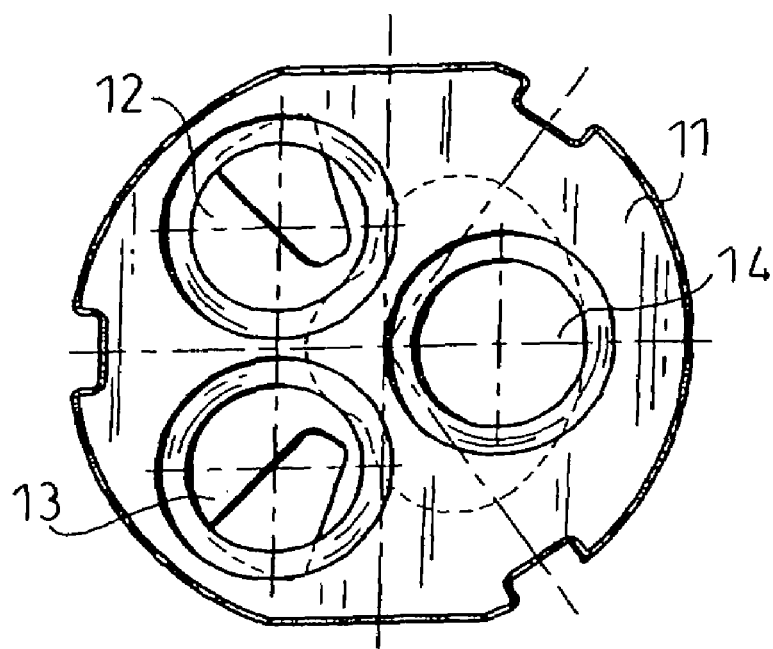
FIGS. 3 and 4 show the inlet disc in bottom and top view.
Figure 4:
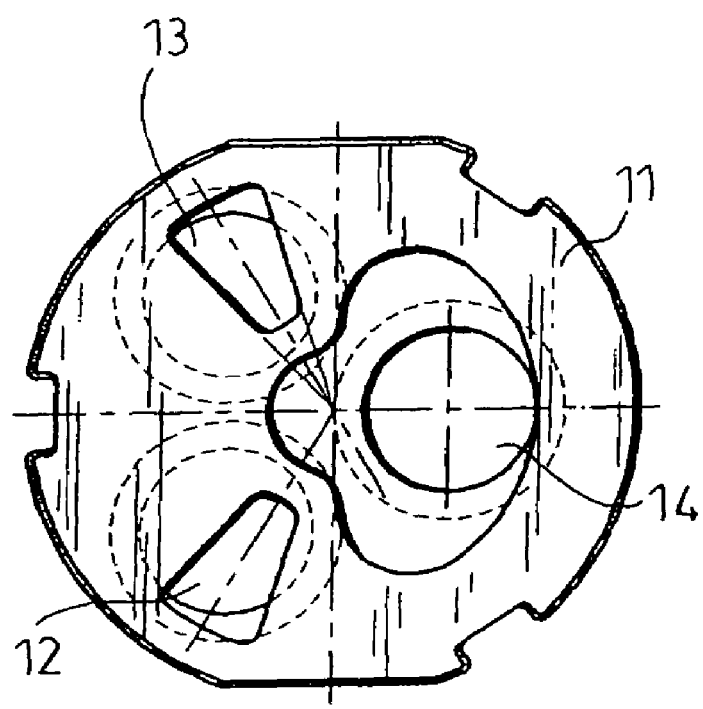

An inlet disc 11 is placed above footing 4, which is locked against turning in cartridge housing 3. Cold water inlet channel 12 and hot water inlet channel 13 connecting the two surfaces of the inlet disc are developed in the inlet disc 11 as shown in FIGS. 3 and 4, as well as a discharge channel 14. Pipe-like seals 15 are fitted between footing 4 and inlet disc 11. The cold water inlet channel 12 is connected to the opening 5 in footing 4 leading in cold water, whereas inlet channel 13 for hot water is joined to opening 6 leading in hot water. The discharge channel has no function here either, it is connected to opening 7.

A regulation disc 16 is placed onto inlet disc 11. The bearing surfaces of the inlet disc 11 and regulation disc 16 are polished together. The two polished surfaces form a plane seal between inlet disc 11 and regulation disc 16.

Figure 5:
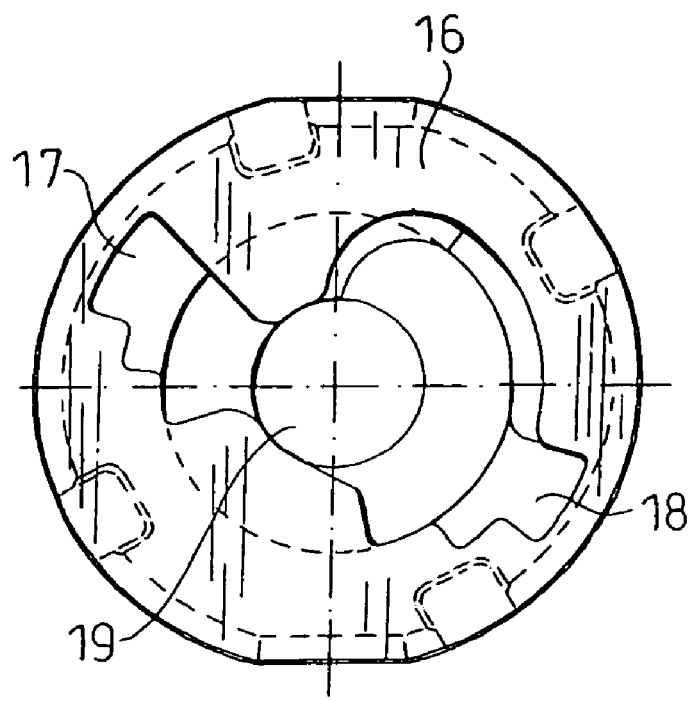
FIGS. 5 and 6 show the regulation disc in bottom and top view.
Figure 6:
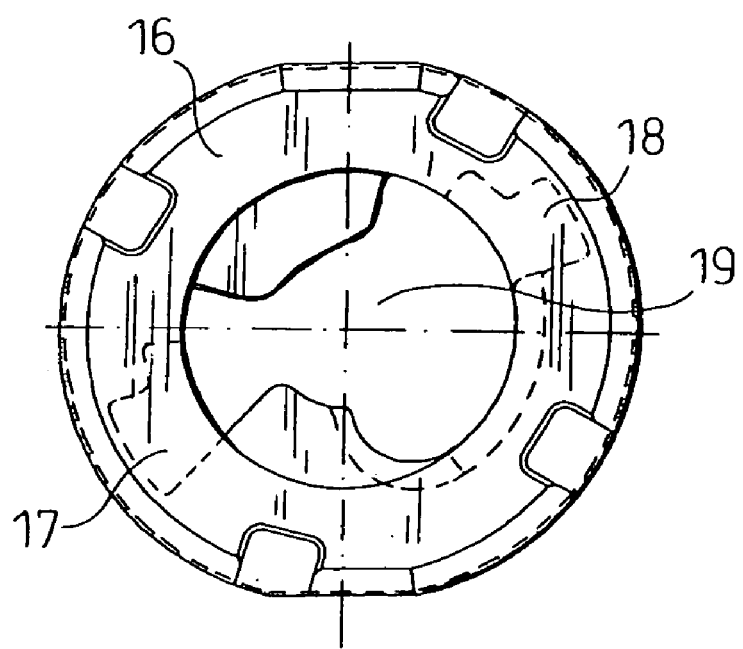

In the regulation disc 16, a flow-through opening reminiscent of an outspread wing is developed, as shown in FIGS. 5 and 6, the two radial sections of which form a cold water flow-through channel 17 and a hot water flow-through channel 18, and its centre part forms the mixing space 19.

The detailed description of the size and arrangement of cold water inlet channel 12 and hot water inlet channel 13, as well as that for cold water flow-through channel 17 and hot water flow-through channel 18 will be given later, in connection with their operation.

A turning element 20 is fitted to the regulation disc 16 from above, opposite to the inlet disc. Turning element 20 consists of two parts. The movable ceramic plate 21 of a larger diameter is in carrying connection with the regulation disc 16. A seal 22, namely an O-ring seal, is fitted between the movable ceramic plate 21 and the regulation disc 16 closing down the mixing space 19 of the regulation disc 16 from the environment. The smooth turning between the movable ceramic plate 21 and the cartridge housing 3 is ensured by a teflon-ring 23.

The movable ceramic plate 21 comprises an axial boring 24, into which an operating spindle 25 of the faucet cartridge 1 is fitted. A carrying connection exists also between operating spindle 25 and the movable ceramic plate 21, they have an O-ring seal 26 between them, as well. Operating spindle 25 comprises an axial, flow-through duct 27.

The upper part of the operating spindle 25 protrudes from the cartridge housing 3 and has a ribbed part near to the housing 3 to which an operating arm 28 is fixed. Above this, an armature discharge is fixed to the upper part of the operating spindle 25 having a duct 30 along its whole length, one end of which is connected to the axial duct 27 in the operating spindle 25, whereas its other end forms a discharge outlet 31. Hence, duct 27 connects the mixing space 19 and duct 30.

Thus, duct 30 is connected to discharge outlet 31. Of course, between the part of the operating spindle 25 outside of cartridge housing 3 and armature discharge 29 an O-ring seal 32 is also fitted.

The operation of the mixing faucet according to the invention can be illustrated on the basis of FIGS. 7–10.

FIGS. 7–10 show the bearing surfaces of the inlet disc 11 and the regulation disc 16 situated above each other. It is only a theoretical picture, since in practice it never can be seen at elements lying on each other. Practically the cooperating regulating edges of the inlet disc 11 and the regulation disc 16 are shown which determine the actual flow-through cross sections. For the sake of better understanding the inlet disc 11 is marked by a continuous line, the regulation disc 16 is marked by a broken line, and the active cross sections are marked by hatching. The operating arm 28 is symbolized by its axis line and its end to the discharge outlet.

Figure 7:
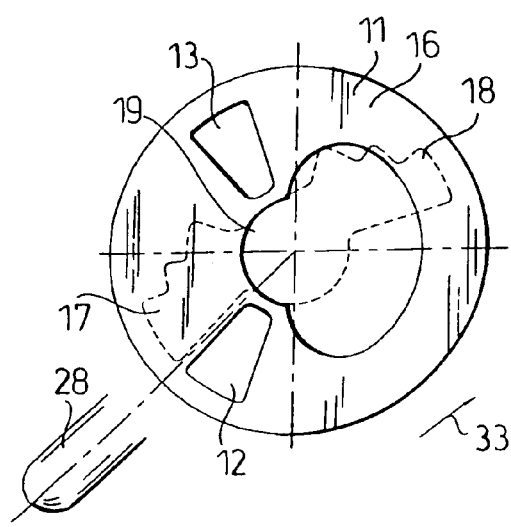
FIGS. 7–10 illustrate the inlet and regulation discs in different operation positions.

In the position shown in FIG. 7, cold water flow-through channel 17 and hot water flow-through channel 18 are situated between the cold water inlet channel 12 and hot water inlet channel 13, hence regulation disc 16 closes down the cold water inlet channel 12 and hot water inlet channel 13, thus neither cold, nor hot water can flow into the mixing space 19. This is the closed position of the faucet cartridge 1, the faucet cartridge 1 in FIG. 1 is shown also in this position.

For opening faucet cartridge 1, operating arm 28 should be turned into the direction shown by an arrow 33. Then, operating arm 28 turns the movable ceramic plate 21 by means of operating spindle 25, together with the regulation disc 16 being in carrying connection with it.

Figure 8:
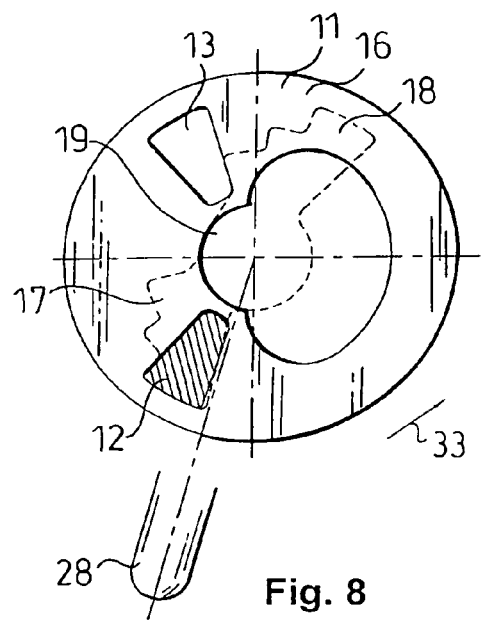

When the regulation disc 16 turns, first the cold water flow-through channel 17 reaches the cold water inlet channel 12 underneath, while the regulation disc 16 keeps the hot water inlet channel 13 closed. In this case, only cold water flows into the mixing space 19. Turning the operating arm 28 by 30° as shown in FIG. 8, the whole cross section of the cold water inlet channel 12 becomes free, this corresponds to the maximum amount of cold water flowing through the system. The cold water getting into the mixing space 19 flows through the duct in the operating spindle 25 into duct 30 in the armature 29, and from there into the environment through discharge outlet 31.

Figure 9:
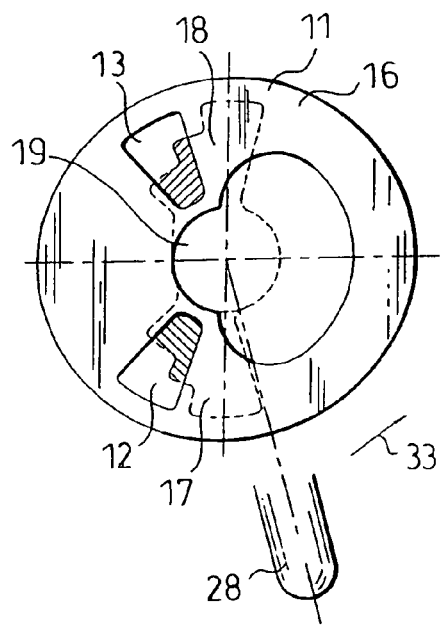

Turning the operating arm 28 into the direction of the arrow 33, hot water flow-through channel turns also above the inlet channel 13 for hot water, thus flow of hot water starts also through inlet channel 13, as shown in FIG. 9. This way, hot water from the hot water inlet channel 13 is mixed into the cold water flowing into the mixing space 19. It is easy to see that the temperature of the discharged water is determined by the flow-through cross sections of the cold water inlet channel 12 and the cold water flow-through channel 17, together with those of the hot water inlet channel 13 and the hot water flow-through channel 18.

Figure 10:
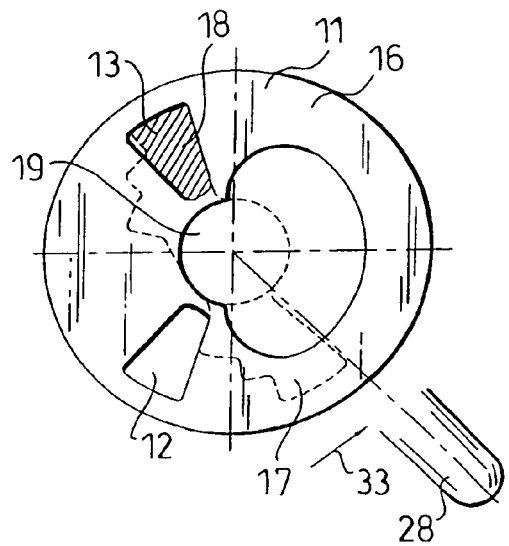

At the point where the operating arm 28 is turned by 90° into the direction of the arrow 33, the cold water flow-through channel 17 turns over the cold water inlet channel 12, thus the regulation disc 16 closes the inlet channel 12. The hot water flow-through channel 18 gets fully above the hot water inlet channel 13, hence the whole cross section of the hot water inlet channel 13 gets free. This is the position, in which the amount of hot water flowing through the system is maximum. This position is shown in FIG. 10. In the extreme position of operating arm 28 hence only hot water is flowing into the mixing space 19, and from here into the environment through ducts 27 and 30, then through discharge outlet 31.

For closing the faucet cartridge 1, the operating arm 28 should be turned opposite to the direction of arrow 33.

It is to be seen that changing the temperature of the water flowing out through discharge outlet 31 from lower to higher, or from higher to lower is continuous, we can not jump over the temperatures in-between. Theoretically, the temperature of the water should be adjusted to every in-between temperatures, if only for a very short time, and only after this can the desired temperature adjusted, i.e. temperature regulation can be performed only in a given series.

It is well seen from this description that a single-grip mixing faucet of a simple structure can be prepared which is simple to handle, and in which the possibility of shifting is eliminated totally by the construction for opening and closing of the faucet cartridge, as well as for adjusting the temperature, as the operating arm should only be turned.

Some remarks are worth making concerning the embodiment shown.

First of all it should be mentioned that though in single-grip mixing faucets the use of faucet cartridges is characteristic, the invention can be used naturally in constructions in which the elements are built directly into the housing of the faucet.

In describing the details, it was mentioned for several elements that they are applicable in faucet cartridges of other design, thus they contain also elements not participating in the operation of the faucet cartridge according to the invention. It can be seen from the description of the operation that they have in fact no function, but also that their presence does not cause any problem. In spite of this, the elements in question can be developed also so that they do not contain these parts, i.e. they are made particularly for the faucet cartridge according to the invention.

In the embodiment shown the turning element is constructed from two parts, from the moving insert and from the metal arm. The reason for this is that the two parts can be prepared of two different materials, corresponding to the use desired.

There are some arrangements known in which the mixing space is situated above the regulation disc so that in the bottom of the turning element or the moving insert a trough is developed, i.e. the turning element or the moving insert bends over the flow-through channels of the regulation disc like a bell. The invention can be used for such designs as well.

The invention claimed is:

1. Arrangement for single-grip mixing faucets being operated by turning only, comprising a fixed inlet disc (11) and a rotating regulation disc (16) arranged above each other and forming a plane seal by their bearing surfaces, for regulating the amounts and the ratio of the cold and hot water flowing through the system, the cold water inlet channel (12) connected to the cold water network and the hot water inlet channel (13) are developed in the fixed inlet disc (11), whereas the cold water flow-through channel (17) and the hot water flow-through channel (18) are developed in the rotating regulation disc (16), the cold water flow-through channel (17) and the hot water flow-through channel (18) are connected to a mixing space (19), which is developed either in the regulation disc (16) or in a turning element (20) being in an operating connection with the regulation disc (16) and situated at the side of the regulation disc (16) opposite to the inlet disc (11), the operating arm (28) is fixed to a part of the turning element (20) opposite to the regulation disc (16), characterized in that in the turning element (20) an axial duct (27) is situated leading through also the operating arm (28), one end of the duct (27) is connected to the mixing space (19), whereas the other end is in connection with the boring (30) developed in the armature discharge outlet (29) connected to the turning element (20) above the operating arm (28), the boring (30) being in connection with the discharge outlet (31).

* * * * *